W. N. SPRINGER.
CULTIVATOR MECHANISM.
APPLICATION FILED AUG. 17, 1915.
1,358,997.
Patented Nov. 16, 1920.
3 SHEETS—SHEET 1.
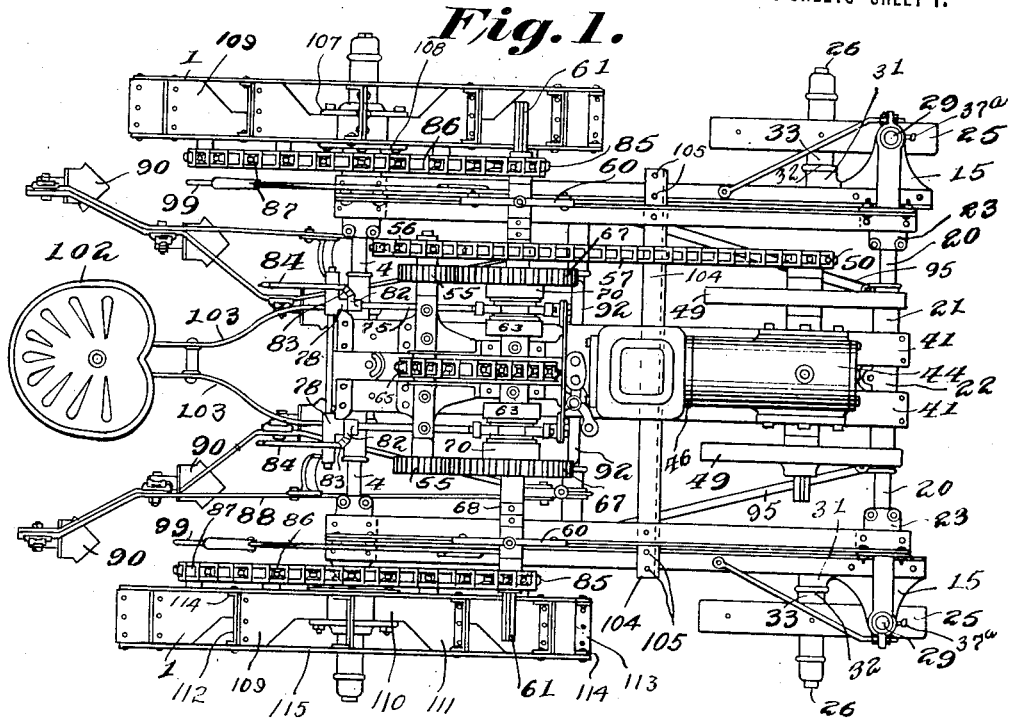
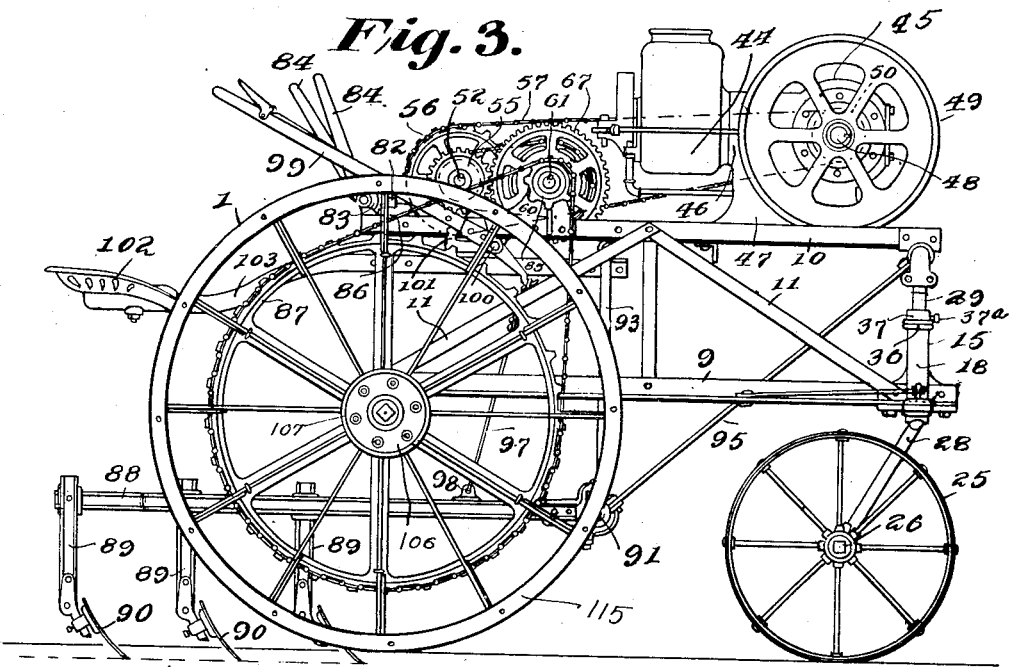

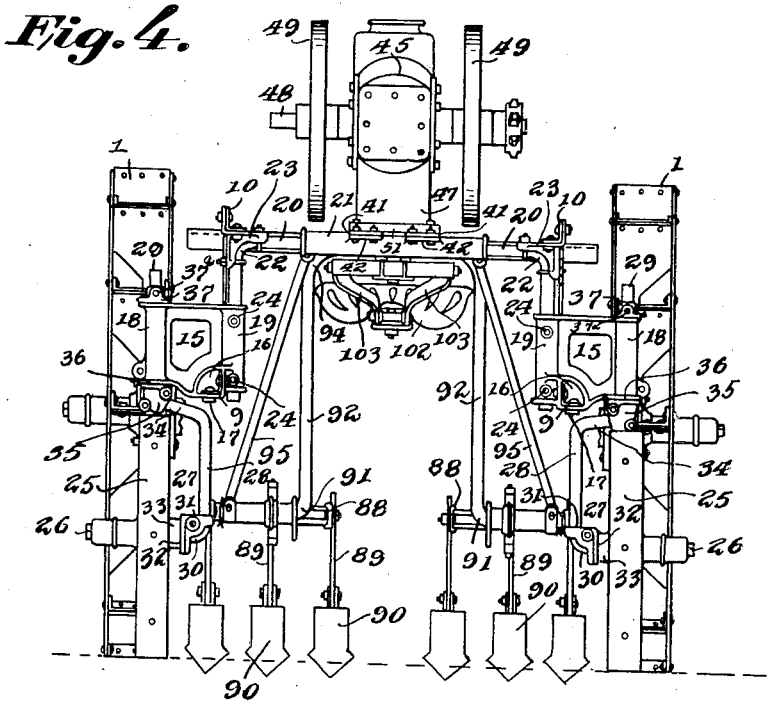
W. N. SPRINGER.
CULTIVATOR MECHANISM.
APPLICATION FILED AUG. 17, 1915.
1,358,997.
Patented Nov. 16, 1920.
3 SHEETS—SHEET 2.

UNITED STATES PATENT OFFICE.

WILLIAM N. SPRINGER, OF SOUTH BEND, INDIANA, ASSIGNOR TO THE ILLINOIS SILO COMPANY, OF BLOOMINGTON, ILLINOIS, A CORPORATION OF ILLINOIS.

CULTIVATOR MECHANISM.

1,358,997.   Specification of Letters Patent.   Patented Nov. 16, 1920.

Application filed August 17, 1915. Serial No. 45,968.

*To all whom it may concern:*

Be it known that I, WILLIAM N. SPRINGER, a citizen of the United States, residing at South Bend, in the county of St. Joseph and State of Indiana, have invented certain new and useful Improvements in Cultivator Mechanism, of which the following is a specification, reference being had therein to the accompanying drawing.

This invention relates to improvements in self-propelling tillage implements, improvements particularly in the light implements of the cultivator sort.

The object is to provide a strong and durable apparatus with the motor parts elevated to high planes so that the implement can be used in cultivating plants that have grown to considerable height; one which will not pack the earth but can be used upon light soil and leave it open and porous; and one which can be delicately steered so as to bring the tools close to the plant stalks without danger and enable the operator to follow curvatures in the rows or to keep the machine in proper position upon slopes or hills.

Figure 1 is a plan view of a tillage implement embodying my improvements;

Fig. 2 is a rear elevation of the same, the tools being omitted;

Fig. 3 is a side elevation;

Fig. 4 is a front elevation;

Figure 5:
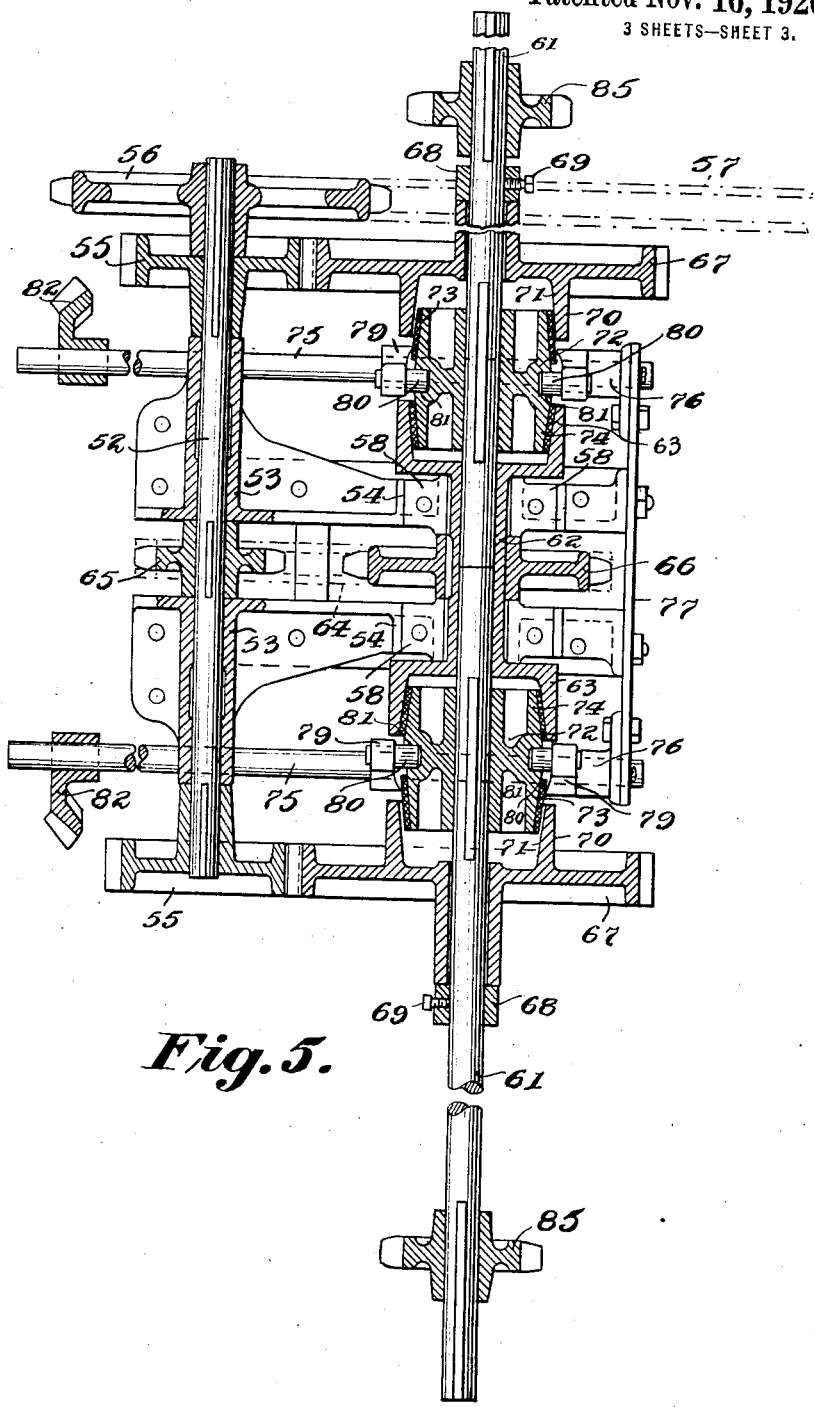
Fig. 5 is a section of the devices for transmitting power for reversing, steering, etc.

In the drawings, 1, 1 indicate the rear wheels which, as will be described, not only support the rear end of the mechanism but also are used for traction or driving purposes Each is mounted upon the spindle part 2 of a two-part axle 3, this having the upper horizontal parts 4 and the vertically arranged parts 5 each with bends at 6 and 7.

On this wheel frame is supported the frame structure. It comprises two side frame elements 8, 8, each having a longitudinal sill 9, and an upper longitudinal sill 10, together with brace bars 11, 11. The rear end of each bottom sill is secured to the bend at the inner end of the adjacent axle section by means of a bracket 12 which is fastened to the axle by clip bolts 13. This bracket 12 is formed with a seat having sides at right angles to each other, and in this is seated the rear end of the sill 9 which is fastened by bolts 14.

At the front end the sill 9 is fitted in a bracket 15 which has an aperture 16 (to receive the end of the sill) and flanges for the fastening bolt 17. The bracket 15 lies in transverse planes, and has two tubular sockets 18 and 19.

At the front of the machine there is an arch 20 formed in two sections. These are adjustably (transversely of the machine) secured in a tubular part 21. Each has a bend at 22 and to it, at the bend, there is secured a bracket 23. The lower part of the leg of the arch bar is seated in the tubular socket 19 of the bracket 15 and is permanently clamped therein by set screws at 24.

25, 25 indicate the front wheels. Each is mounted on the spindle part 26 of a castering arm 27 preferably formed from a piece of rod metal bent to provide the spindle 26, the rearward inclined arm 28 and a vertical spindle part 29. The latter spindle is mounted in the tube socket 18 of the bracket 15. At the bend 30 in this caster arm there is a bracket 31 with apertured ears through which the spindle rod passes and with a square surface at 32 to furnish an abutment bearing for the wheel hub 33. At the upper bend 34 there is a bracket 35 with a passage for the bent part of the caster arm and with a square shoulder at 36 upon which rests the flanged lower end of the tube 18 and the bracket 15. 37 is a collar with a set screw 37ª fastened to that part of the vertical spindle 29 which projects above the bracket 15 and holds the spindle 29 firmly in its bearing.

The upper longitudinal sill 10 of the framework is at the front end secured in a seat on the front bracket 23, this sill bar like the lower one at 9 being of suitable angular cross section. At its rear end it is fitted to a bracket casting 38 which, by U-bolts 39, is clamped to the upper bend 6 in the axle section, see Fig. 2.

40 indicates a tube horizontally arranged and adapted to receive the upper parts 4 of the crank axle sections. These can be laterally adjusted therein and secured at any desired position. 41, 41 indicate two longitudinal flat bars or plates which extend from the tube 21 of the front arch to the tube 40 of the axle, the former tube being provided with flanges 42, and the latter with flanges 43 to which these bars are bolted. Upon the front parts of these bars 41, 41 is mounted the engine. It is of the internal combustion class, comprising the cylinder 44, the crank case 45, the housing 46, the base 47, the crank shaft 48, the fly wheels 49, and the prime pinion 50. The base is formed with flanges 51 by which the engine is detachably bolted to the bars or plates 41, 41.

The power transmitting system comprises the following shafts, gears and mountings. 52 is a jack shaft mounted in bearings 53, 53 see Fig. 5 in the central brackets 54, 54 rising from and bolted to the rear ends of the upper longitudinal frame bars or plates 41, 41. It projects beyond the bearings and carries rigidly fixed thereon two spur pinions 55, 55, and also a sprocket gear 56. It receives power from the engine shaft 48 by the chain 57 connecting the prime pinion 50 with said sprocket 56.

This shaft 52 is connected to a countershaft 61, also arranged transversely, on lines between the jack shaft and the engine. It is mounted in bearings 58, 58 in the aforesaid central brackets 54, and is also supported in bearings 59, 59, carried by brackets 60, 60 which are bolted to and rise from the top frame sills 10. This counter shaft is in two sections 61, 61, which can be rotated together and in the same direction, or can be rotated independently or in opposite directions.

62 is a tubular shaft or sleeve in which the inner ends of the shaft sections 61, 61 are fitted in such way as to be loose and independently movable therein. This hollow shaft or sleeve 62 rests on the bearings 58, and carries the two cup elements 63, 63 of cone friction clutches.

It receives power from the jack shaft 52 by the chain 64 which engages with the driving sprocket pinion 65 on the shaft 52 and also engages with and drives the sprocket 66 on the hollow shaft 62. This sprocket wheel 66 is situated between the brackets 58, 58.

Each of the spur pinions 55 engages with a spur wheel 67 mounted loosely on the counter shaft (or on one of the sections 61).

Each shaft section 61 has one or more spacing collars 68 held by set screws 69 and interposed between the hub of the wheel 67 and the bearing 59, these insuring that the shaft sections shall be held rigidly axially against displacement. Each of these spur wheels 67 has a hollow hub 70 with a friction cone surface at 71.

72, 72 indicate cone friction elements each being formed with two cone sections 73 and 74, one adapted to engage with the friction cup 63 on the hollow shaft 62 and the other adapted to engage with the cone socket 71 in the hub 70 of the wheel 67.

These clutch elements 72, 72 are splined to the counter shaft and are adapted to slide thereon in either direction. Each is moved by a rocking clutch shaft 75 which is mounted in a front bearing 76 carried by a bar 77, secured to the central brackets 54, and at its rear in a bearing 78 carried by a bracket secured to the rear tube 40 at the upper part of the wheel frame. This rock shaft also has arms 79 which carry shifting pins 80 that are seated in the groove 81 in the sliding element of the friction clutch. Each rock shaft 75 has a pinion or segment gear 82. With this engages a segment gear 83 carried by a lever 84. When the lever is thrown in one direction the sliding clutch element is moved to engage with the wheel 67; and when it is moved in the opposite direction the cone engages with the cup 63.

The counter shaft is also provided with two sprocket pinions 85, 85. Each of these transmits power to a ground wheel 1 by means of a chain 86 engaging with a large sprocket wheel 87 secured to the inner faces of the wheel spokes, or otherwise made rigid with the ground wheels.

The structure composed of the parts above described is shown as being provided with two gangs of cultivating devices. Each gang has a drag bar 88 provided with standards 89, 89, and shovels or hoes at 90. The drag bar is mounted upon the spindle 91 of an arch bar 92 having two of the spindles 91, the vertical legs 93 and the cross central part 94. The latter is supported upon that part of the apparatus which carries the driver's seat. The spindles are provided with collars near their outer ends, and these are connected by brace rods 95 with flanges or ears 96 on the central tube 21 of the front wheel arch.

Each drag bar is connected to its spindle 91 by a pipe union which provides free swinging of the gang and the shovels laterally, and also permits them to be lifted with a rocking movement. 97 is a link extending upward from a pivot bracket 98 on the gang bar and loosely connected to the lower end of the control lever 99 which is pivoted at 100 to a bracket carried by the upper sill bar 10 and held in place by a detent and segment at 101.

102 indicates the driver's seat, which is carried by the bifurcated bar 103, which is suitably connected to the machine frame. The seat is thus disposed well to the rear of the vertical axial plane of the driving and steering wheels so that the weight of the driver serves to largely counterbalance the weight of the engine and other forward parts of the machine.

As will be seen, the cultivating implement is self-propelling, is provided with a centrally arranged motor, which is in an elevated horizontal plane, so that plants of considerable height can be cultivated by the implement. The parts are so arranged that the weight of the driver and the weights of the engine parts are approximately counterbalanced around the axis of the rear wheels so that the greatest traction efficiency is insured.

The counter shaft is connected to the jack shaft by three trains of gears, one being the chain and sprocket gear at the center and the others being the spur gear connections at the sides.

The sprocket gear 65—66 is continuously driving the hollow shaft 62 in one direction. When the operator, by the levers 84, throws both the cones 72 into engagement with the friction cups 63, the machine advances rectilineally forward, the power passing from the chain 64 and sprocket wheel 66 to the hollow shaft 62 and friction cups 63, thence to the sliding cones 72, to the counter shaft, and both of the sprocket pinions 85 are turned with equal speed and in the said direction.

When, on the other hand, the operator, by the shifting rock shaft, throws both the cones 72, 72 outwardly and engages them with the spur wheels 67, 67 the central sprocket gear idly rotates and the trains of spur gears simultaneously rotate the sections 61, 61 of the counter shaft with equal speeds, but in a direction reverse to that above described, so that the ground wheels 1, 1 are reversed and the machine moves backward.

Again, if the operator, by means of the right hand lever 84, throws the right cone 74 inward and at the same time holds the left hand cone in the neutral position, the left hand ground wheel will be inactive and the right hand wheel will effect a turning of the machine toward the left. The caster wheels accommodate themselves to any of the directions in which the machine is propelled by the different manipulations of the power transmitting part.

If the driver, while having the right hand sliding clutch element engaged with its inner cup element 63, at the same time throws the left hand clutch element outward toward its spur wheel 67, the right hand ground wheel will rotate forward while the left hand wheel rotates backward and a much more rapid turning of the machine as a whole is effected.

And by reversing the action of the clutches he can throw the machine toward the right either slowly or rapidly, as he desires.

With a tillage machine constructed in this manner rows of plants can be followed closely, the tools can be guided to or from the rows, deflections of the rows from straight lines can be accurately followed, and the machine can be closely controlled on slopes or hill sides.

The engine is detachable and can be made ready for other uses in a few moments. I have found that an engine of small size and weight is sufficient for a tillage implement, one capable of developing from one to two horse power being sufficient for the purpose when the parts are constructed and arranged in the way described.

In order to strengthen the upper part of the frame immediately below the engine I prefer to employ the cross girt 104, which can be bolted to the top sills 10, this girt having a series of bolt apertures 105, 105 to permit lateral adjustments.

The width covered by the machine can be varied as the upper parts 4 of the crank axle for the wheels can be adjusted inward or outward in the tube 40 as can also the upper parts of the front wheel arch in the front tube 21.

The drive wheels 1 are made in a way which specially fits them for tillage use. They are constructed so as not to pack the ground and yet provide strong traction. Each is formed with a hub 106 having the flange 107 on the outer side and the flange 108 on the inner. To these flanges are secured the inner ends of spoke plates 109, each of these plates having a narrower inner end part 110 and a wider part 111. 112, 112 are angle clips having a central part 113 which is firmly bolted to the outer end of the spoke plate, and having also the shorter ear parts or flanges 114, 114 which are bolted to peripheral rings 115, 115. The spoke plates are arranged comparatively closely together so that there shall always be a sufficient part of the wheel resting on the ground to prevent its sinking deeply; at the same time the periphery of the wheel is largely open so as to prevent packing, and insure a firm traction grip at the end parts of the spokes where they contact with the surface of the soil.

The machine may be regarded as comprising a rear wheel frame, a front wheel frame, a main central frame, and two side frames. Each side frame and the corresponding side parts of each wheel frame are adjustable outward and inward, the central main frame remaining relatively fixed in position. And upon this central main frame the power transmitting parts are all fixed, axially, even the two-part counter shaft, the only adjustable parts required in this part of the mechanism being the sprocket pinions 85.

Advantages incident to the adjustability of the side frames of the machine and other associated parts, in working plants of differing sizes or shapes, will be obvious.

It will be observed that the two gangs of tools are coupled to the frame parts at points well in advance of the vertical axial plane of the driving wheels and consequently the swinging of the frame by the steering action of the driving wheels causes quick and effective shifting of the tools to follow the row of plants. In this connection note should be made of the advantage incident to the use and arrangement of the castering wheels at the front corners of the frame; for by virtue of the trailing position which these wheels maintain with respect to their supporting spindles, when the frame is shifted to follow the row, a relatively wide swing of the frame is permitted without interfering with the plants, as compared with the amount of swing that would be possible if the front wheels were not of a castering or trailing character. It will be understood that the steering of the machine is facilitated by virtue of the fact that the weight of the driver is disposed so as to largely counterbalance the weight of the forward parts of the machine so that the major part of the entire weight is carried directly on the driving and steering wheels; thus the front castering wheels, being only lightly loaded, act freely to permit the lateral swinging of the frame.

What I claim is:

1. In a device of the class described, a body portion, a pair of drive wheels thereon, a pair of caster wheels near the end of said body portion, and means for increasing and decreasing the lateral distance between said drive wheels, and means for increasing and decreasing the lateral distance between said caster wheels.

2. In a device of the class described, a central frame having a side frame on each side thereof, a rear traction wheel secured to each frame, a front castering wheel secured to each of said side frames, said side frames being laterally adjustable on said central frame whereby the wheel track of said device may be made wide or narrow as desired.

3. In a tractor, a central frame, a side frame on each side of said central frame, a driving wheel secured to each side frame, a caster wheel secured to each of said side frames, said side frames having considerable height whereby to provide clearance for tall crops when used in cultivating, and said side frames being laterally adjustable on said central frame to enable the wheel track to be made wide or narrow as desired.

4. In a device of the class described a body portion, a pair of traction wheels on said body portion, a caster wheel, means for driving said traction wheels simultaneously in the same or opposite directions, a downwardly extending hanger in front of the axis of said traction wheels and having on its lower end and below the center of said axis a bearing adapted to form connecting means for a device to be drawn, and a brace rod extending from said bearing to and secured at a point on said body portion a considerable distance above the caster wheel.

5. In a tractor a body portion, a pair of traction wheels on one end of said body portion, a caster wheel mounted to loosely caster at the other end of said body portion, a source of power on said body portion, means connecting said source of power and said traction wheels to drive the latter simultaneously in the same or opposite directions, said means comprising two pairs of expanding frictional clutches, one pair of these clutches controlling the forward and reverse motion of the right hand drive wheel and the other pair controlling the forward and reverse motion of the left hand drive wheel, permitting said wheels to be driven at varying speeds when desired.

6. In a device of the class described the combination of a frame having a relatively elevated central part, two driving wheels mounted on the frame one at either side thereof, supplemental means for supporting the frame from the ground comprising a pair of caster wheels arranged at a point remote from the vertical axis of the driving wheels, a source of power on said frame, connections between said source of power and said last mentioned wheels to drive them simultaneously in the same or opposite directions, and a pair of depending brackets each having a bearing in front of and lower than the axle of said driving wheels and adapted to form attaching means for a device to be drawn and a brace member extending from each of said bearings to and secured at a point considerably above said caster wheels respectively.

7. In a device of the class described a central frame having a side frame on each side thereof, a traction wheel on each of said side frames, a caster wheel on each of said side frames, means on said central frame to drive said traction wheels simultaneously in the same or opposite directions, said side frames being laterally adjustable on said central frame whereby to increase and decrease the lateral distance between the oppositely located wheels on the side frames.

8. In a device of the class described, a body portion having a pair of traction wheels and a caster wheel thereon, means for operating said traction wheels simultaneously in the same or opposite directions, means for increasing and decreasing the lateral distance between said traction wheels, and a depending hanger having at a point in front of and below the center of the axis of the traction wheels a bearing adapted to form connecting means for an implement to be drawn.

9. In a device of the class described, a pair of side frames connected near their respective ends by a pair of arched wheel frames, said wheel frames carrying respectively a pair of traction wheels and a pair of caster wheels, a depending hanger secured to said side frames and having at its lower end at a point in front of and below the axis of the traction wheels a bearing adapted to form connecting means for an implement to be drawn, and a brace member extending from said bearing to and secured at a point on the upper part of the arch of the caster wheel frame.

10. In a device of the class described, a pair of side frames connected near their respective ends by a pair of arched wheel frames, said wheel frames carrying respectively a pair of traction wheels and a pair of caster wheels, and means on each of said arches to permit their sides to be moved toward or away from each other whereby to increase or decrease the lateral distance between said wheels.

11. In a device of the class described, a pair of side frames connected near their respective ends by a pair of arched wheel frames carrying respectively a pair of traction wheels and a pair of caster wheels, means for driving said traction wheels simultaneously in the same or opposite directions, and means for connecting implements to be drawn closely in between said traction wheels.

12. In a device of the class described, a central frame having a pair of side frames on each side thereof, a pair of traction wheels secured to said frames at the rear end of said device, a pair of caster wheels at the front end thereof, an operator's seat projecting to the rear of said traction wheels, driving mechanism on said central frame, a draw bar connection below and in front of the axis of said traction wheels, all of said parts so located that the motor thrust and the draw bar pull so equalize each other as to throw substantially all the weight on the traction wheels to give the maximum tractive effort thereto.

13. In a device of the class described, a pair of side frames connected near their respective ends by a pair of wheel frames carrying respectively a pair of traction wheels and a pair of caster wheels, means for driving said traction wheels simultaneously in the same or opposite directions, and means for connecting implements to be drawn closely in between said traction wheels.

In testimony whereof I affix my signature in presence of two witnesses.

WILLIAM N. SPRINGER.

Witnesses:
 HELEN JANOUSKI,
 WILLIAM HAGERTY.